United States Patent [19]

Olney

[11] Patent Number: 5,355,924
[45] Date of Patent: Oct. 18, 1994

[54] VEHICLE WHEEL INCLUDING SELF-INFLATING MECHANISM

[75] Inventor: Ross D. Olney, West Hills, Calif.

[73] Assignee: Hughes Aircraft Company, Los Angeles, Calif.

[21] Appl. No.: 957,292

[22] Filed: Oct. 6, 1992

[51] Int. Cl.⁵ .............................................. B60C 23/10
[52] U.S. Cl. .................................. 152/418; 417/211; 417/233
[58] Field of Search ................ 152/415, 418; 417/211, 417/231, 233, 472

[56] References Cited

U.S. PATENT DOCUMENTS

| | | | |
|---|---|---|---|
| 862,867 | 8/1907 | Eggleston | 417/472 |
| 1,254,903 | 1/1918 | Hall | 152/418 |
| 1,887,715 | 11/1932 | Hester | 417/233 |
| 1,930,041 | 10/1933 | Crowley et al. | 417/233 X |
| 2,055,983 | 9/1936 | Peo | 417/233 |
| 2,969,761 | 1/1961 | Youtie | 417/211 |
| 4,067,376 | 1/1978 | Barabino | 152/418 |
| 4,269,252 | 5/1981 | Shapiro | 152/426 |
| 4,349,064 | 9/1982 | Booth | 152/418 |
| 4,742,857 | 5/1988 | Gandhi | 152/418 |
| 4,840,212 | 6/1989 | Wei | 152/419 |
| 4,922,984 | 5/1990 | Dosjoub, et al. | 152/415 |
| 4,938,272 | 7/1990 | Sandy, Jr. et al. | 152/427 |
| 5,052,456 | 10/1991 | Dosjoub | 152/415 |

FOREIGN PATENT DOCUMENTS 126207  1/1932  Austria .

OTHER PUBLICATIONS

EPIC Technologies, Inc. brochure, "Technical Description EPIC Low Tire Warning System", published at least as early as Jul. 1990.

Primary Examiner—Michael W. Ball
Assistant Examiner—Francis J. Lorin
Attorney, Agent, or Firm—V. D. Duraiswamy; W. K. Denson-Low

[57] ABSTRACT

A reservoir is formed in a wheel of a vehicle for storing high pressure air for inflating a tire mounted on the wheel. A regulating valve communicates the reservoir with the tire when the air pressure in the tire drops below a predetermined value to maintain the tire fully inflated. A mechanism for automatically replenishing the high pressure air in the reservoir includes a radially extending bore formed in the wheel, and a piston which is sealingly movable in the bore. A variable volume compression chamber is defined in the bore between the radially outer ends of the bore and the piston. When the vehicle is stopped, a relatively weak spring urges the piston to a radially innermost position in which an inlet check valve opens to allow communication of the chamber with the atmosphere so that the chamber can be filled with fresh air. When the vehicle accelerates above a predetermined speed, the piston is moved radially outward against the spring by centrifugal force to compress the air in the chamber, and an outlet check valve opens to allow communication of the chamber with the reservoir so that compressed air can be pumped into the reservoir.

12 Claims, 5 Drawing Sheets

VEHICLE WHEEL INCLUDING SELF-INFLATING MECHANISM

BACKGROUND OF THE INVENTION

1. Field of the Invention

The present invention relates to a self-inflating system for a tire of an automotive or other vehicle, and more particularly to a system in which the tire is automatically inflated from a high pressure reservoir in response to a sensed low pressure condition in the tire, and the high pressure air in the reservoir is also automatically replenished.

2. Description of the Related Art

Low tire pressure is an important cause of excessive fuel consumption, tire wear and impaired steerability. A normal tire will typically leak on the order of 25 percent of its pressure per year due to its inherent permeability. It is thus good practice to maintain tire pressure on a regular basis.

However, even checking tire pressure every few weeks may not prevent these adverse affects when a slow leak is present, and the leak may go undetected unless a careful record is maintained of how frequently the pressure in each tire has to be replenished. A fast leak or flat condition can rapidly cause damage to the tire and even render it unusable in a short period of time, but this condition may go unnoticed by an inexperienced driver until it is too late.

It is thus highly desirable to have some mechanism that automatically replenishes the tire pressure when it is too low. One such system is disclosed in U.S. Pat. No. 4,067,376 to Barabino. This patent incorporates a high pressure reservoir into the vehicle wheel, and uses a valve that automatically opens a passageway between the high pressure reservoir and the tire in response to the tire pressure falling below a selected threshold level.

In a prior art system of the type disclosed by Barabino, the high pressure air reservoir becomes progressively depleted as the air stored therein is used for maintaining full inflation of the tire. For this reason, the reservoir must be filled at intervals ranging from several months to a year or more depending on the size of the reservoir and the condition and use of the tire. This is disadvantageous in that a service operation for replenishing air for the tire is still required. A driver who neglects to check tire pressure will most likely also neglect to fill the reservoir, and the tire will begin to lose pressure when the air supply in the reservoir drops below a minimum level.

SUMMARY OF THE INVENTION

The present invention overcomes the drawbacks of prior art self-inflating tire systems by providing a mechanism which automatically replenishes the air supply which is used for inflating the tire. The system is completely automatic, and eliminates the possibility of low tire pressure resulting from failure of the driver to perform a service operation.

More specifically, a pressurizing system for a tire of an automobile or other type of vehicle includes a reservoir formed in a wheel of the vehicle for storing high pressure air for inflating the tire which is mounted on the wheel. A regulating valve allows communication of the reservoir with the tire when the air pressure in the tire drops below a predetermined value so that the tire can be maintained fully inflated.

A mechanism for automatically replenishing the high pressure air in the reservoir includes a radially extending bore formed in the wheel, and a piston which is movable in the bore and forms a seal with the inner wall of the bore. A variable volume compression chamber is defined in the bore between the radially outer ends of the bore and the piston.

When the vehicle is stopped, a relatively weak spring or bellows urges the piston to a radially innermost position in which an inlet check valve opens to allow communication of the chamber with the atmosphere so that the chamber can be filled with fresh air. When the vehicle accelerates above a predetermined speed, the piston is moved radially outward against the spring by centrifugal force to compress the air in the chamber, and an outlet check valve opens to allow communication of the chamber with the reservoir so that compressed air can be pumped into the reservoir.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
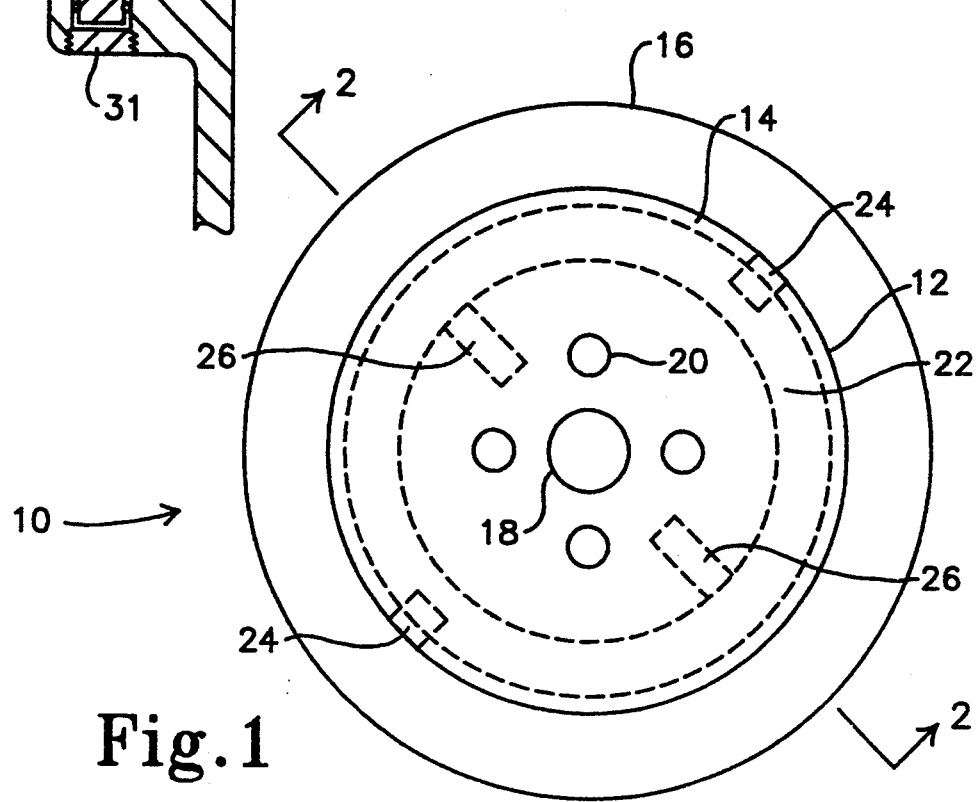
FIG. 1 is a simplified elevational view illustrating a wheel and tire assembly including a pressurizing mechanism embodying the present invention.

As illustrated in FIG. 1, a self-inflating tire system embodying the present invention is generally designated as 10, and includes a wheel 12 having a rim 14 on which a tire 16 is mounted. The wheel 12 is conventionally formed with a central hole 18 for an axle shaft, and holes 20 through which lug bolts (not shown) extend for mounting the wheel 12 on an axle of an automotive or other vehicle.

An annular high pressure air reservoir 22 extends around the wheel 12 under the rim 12, and is filled with air at a pressure which is higher than a predetermined inflation pressure of the tire 16. Typically, it is desired to maintain the tire 16 inflated to 35 psig ($2.41 \times 10^6$ dynes/cm$^2$). The pressure in the reservoir 22 may advantageously be maintained at approximately 50 psig ($3.45 \times 10^6$ dynes/cm$^2$), although the invention is not so limited.

A normally closed pressure regulating valve 24 is provided between the tire 16 and reservoir 22. When the pressure in the tire 16 drops below 35 psig, the valve 24 opens to allow high pressure air from the reservoir 22 to flow into the tire 16. When the pressure in the tire 16 has increased to 35 psig, the valve 24 closes to disconnect the tire 16 from the reservoir 22.

Although not illustrated, it is further within the scope of the invention to provide a switch which is actuated by the valve 24 to have one state (open or closed) when the valve 24 is open and the opposite state when the valve 24 is closed. The switch is connected to a control unit which monitors and controls the operation of a tire management system of the vehicle.

In this case, the operation of the switch is facilitated by providing the valve 24 with hysteresis such that it opens at a pressure which is lower than the normal operating pressure of the tire 16 by a differential pressure ΔP, and closes at the normal operating pressure.

The hysteresis feature causes the valve 24 and switch to remain in the open or closed state for a long enough time to ensure proper filling of the tire 16 and generation of a signal for the management system. The operation of the switch may be further facilitated by making the valve 24 have only two stable states, fully open and fully closed respectively.

The output of the switch may be monitored to detect, for example, a slow leak condition of the tire. If the switch is opened and closed by more than a predetermined number of times during a prescribed period of operation of the vehicle, it indicates that the tire is being replenished from the reservoir 22 excessively due to a slow leak condition.

The differential pressure ΔP is made as small as possible to maximize the number of times the valve 24 and switch will open and close in response to a slow leak condition and thereby provide accurate information to the management system.

For example, if the pressure in a normal tire decreases by 1 psi per month due to the permeability of the tire, and the differential pressure ΔP is 1 psi, the valve 24 and switch will normally open and close once per month. The management system may be arranged to provide a slow leak indication if the pressure drops at four times the normal rate. This condition is determined by the management system in response to opening and closing of the valve 24 and switch four times in one month.

In accordance with the present invention, one or more pressurizing mechanisms 26 are provided to replenish the high pressure air in the reservoir 22. The invention may be practiced by providing only one mechanism 26 and a counterbalancing unit or other means (not shown) at a diametrically opposed location on the wheel 12 to maintain wheel balance, or with two or more mechanisms 26 which are symmetrically circumferentially spaced about the wheel 12 are preferable since they provide increased capacity and do not introduce a source of imbalance to the wheel 12. The mechanisms 26 automatically replenish the air in the reservoir 22 as it is used for maintaining full inflation of the tire 16.

Figure 2:
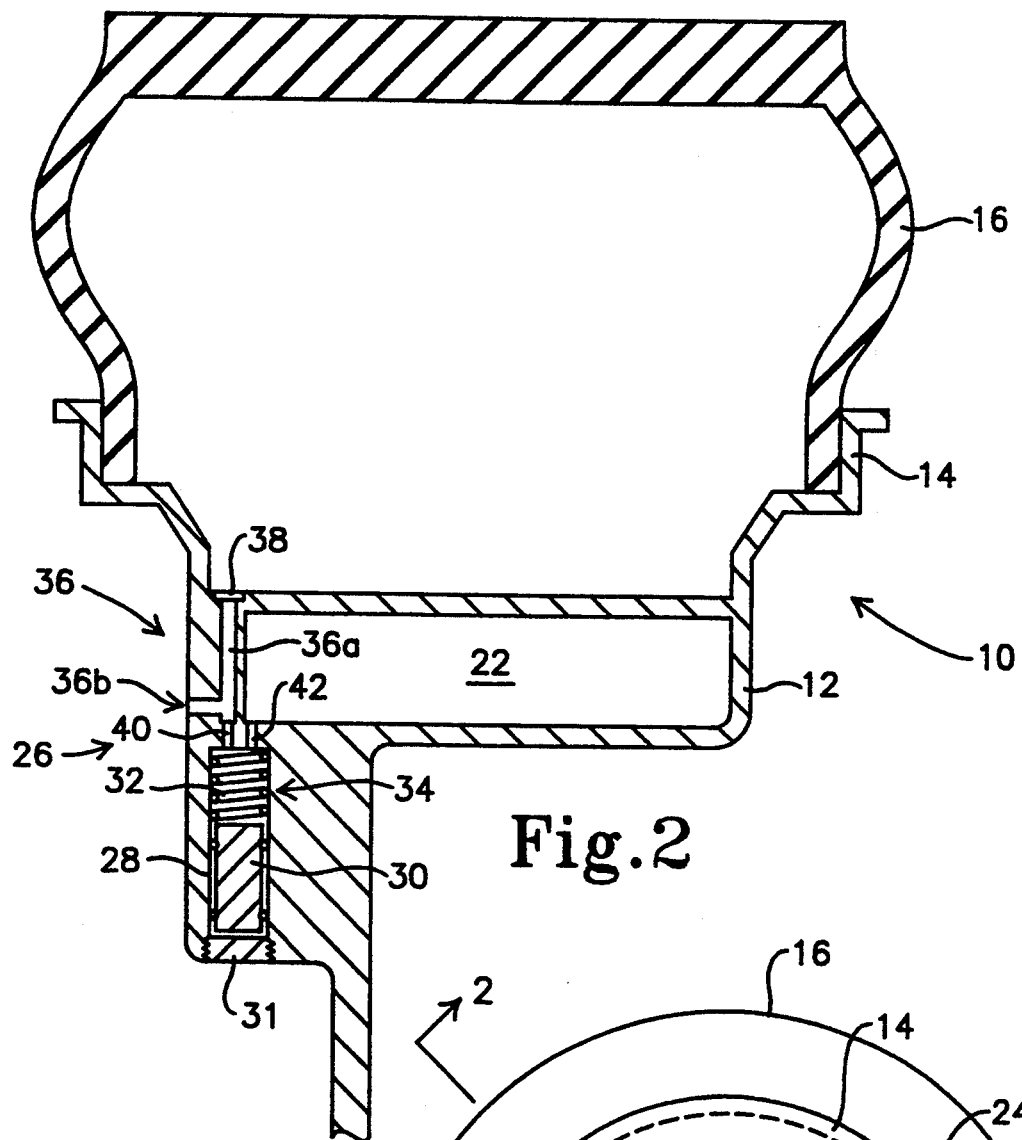
FIG. 2 is a fragmentary sectional view taken on a line 2—2 of FIG. 1 illustrating the present pressurizing mechanism.
Figure 3:
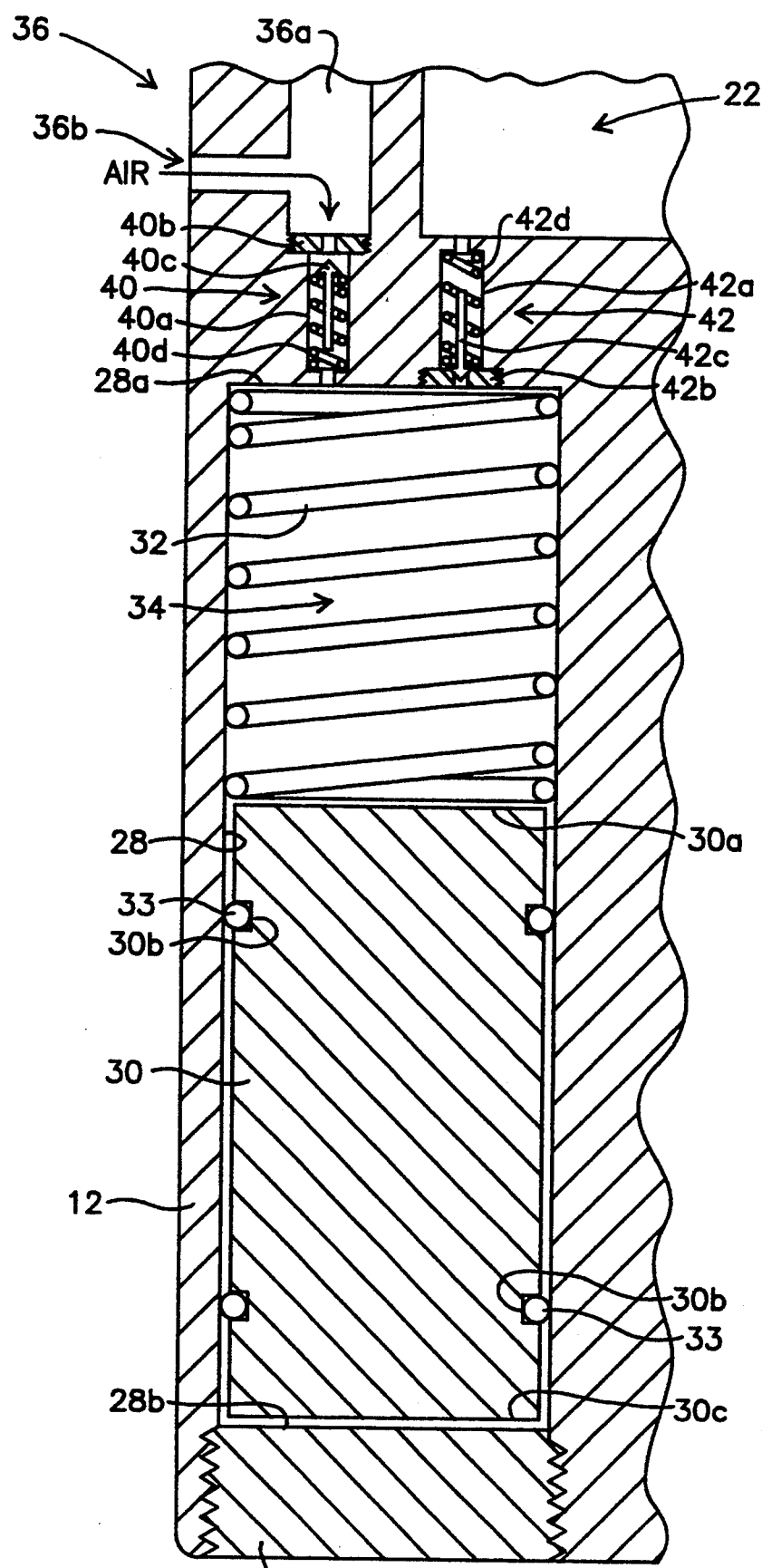
FIG. 3 is an enlarged sectional view illustrating the pressurizing mechanism with the wheel stationary.
Figure 4:
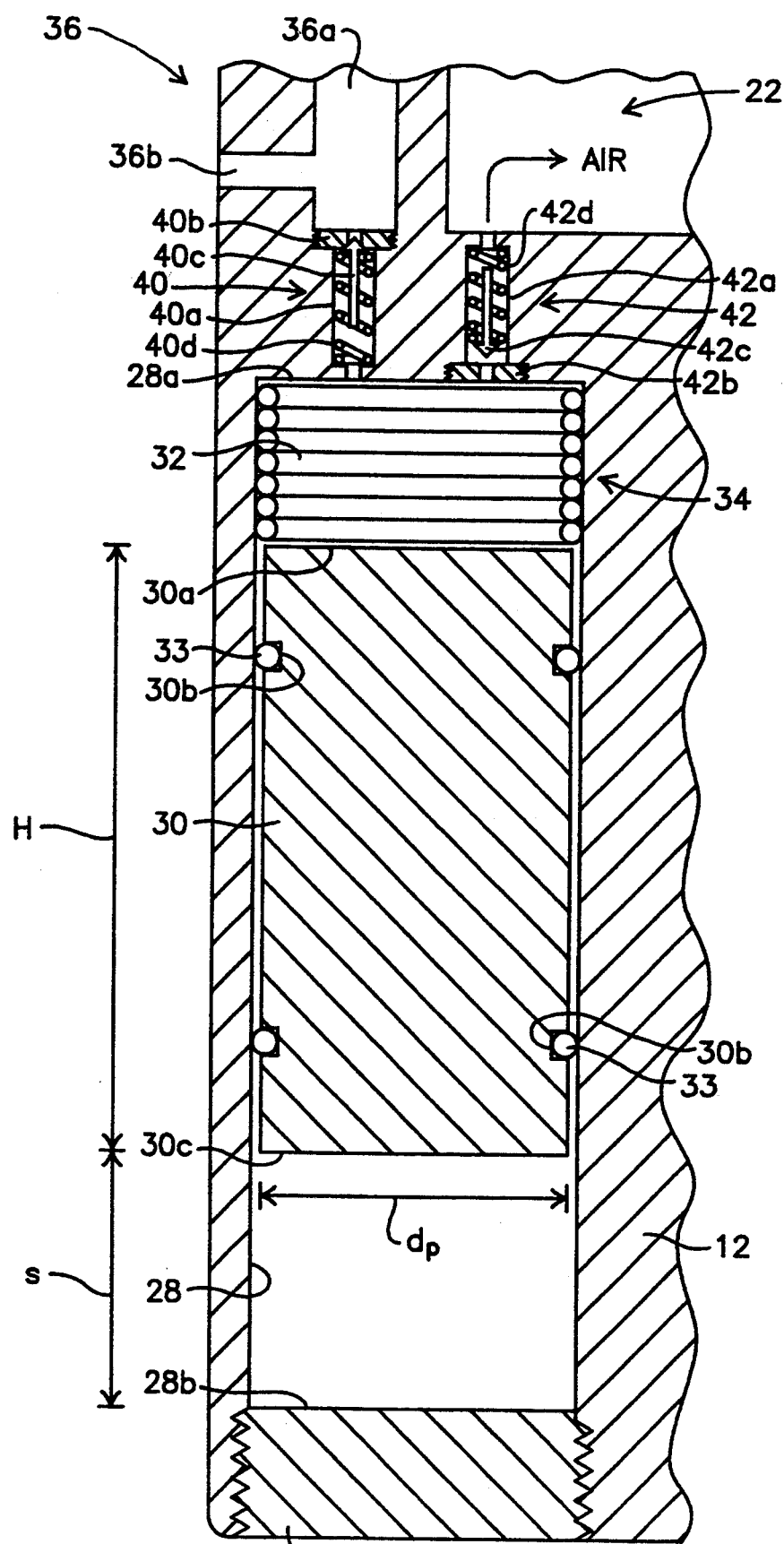
FIG. 4 is similar to FIG. 3 but illustrates the pressurizing mechanism with the wheel rotating at a high speed.

As illustrated in FIGS. 2 to 4, each pressurizing mechanism 26 includes a bore 28 formed in the wheel 12. The bore 28 preferably extends exactly radially to maximize the effect of centrifugal force as will be described below. However, the invention will still be operative if the bore 28 is not exactly radial. The bore 28 can be formed directly in the wheel 12 by machining as illustrated, or equivalently in a separate casing (not shown) which is fixed to and constitutes an integral part of the wheel 12. The lower end of the bore 28 is closed by a threaded plug 31. Another alternative location for the pressurizing mechanism is on the rim 14 of the wheel 12 inside the inflation space of the tire 16.

A piston 30 is slidable in the bore 28 and forms a seal with the inner wall of the bore 28. This will hereafter be referred to as "sealingly slidable". The piston 30 is urged toward a radially innermost position as illustrated in FIGS. 2 and 3 by a relatively weak compression spring 32 which is disposed between radially outer ends 28a and 30a of the bore 28 and piston 30 respectively. The seal between the piston 30 and the inner wall of the bore 28 can be enhanced by O-rings 33 fitted into annular grooves 30b formed in the piston 30, or any other known sealing arrangement. In order to maximize the effect of centrifugal force as will be described below, the piston 30 is located at the maximum radially outward position which is permitted by the design of the wheel 12.

A variable volume compression chamber 34 is defined in the bore 28 between the radially outer ends 28a and 30a. An inlet passageway 36 includes a radial hole 36a, and an axial hole 36b which extends from the radial hole 36a to communicate with the atmosphere. The upper end of the radial hole 36a is closed by a threaded plug 38. An inlet check valve 40 is disposed between the chamber 34 and the hole 36a, whereas an outlet check valve 42 is disposed between the chamber 34 and the reservoir 22.

The inlet check valve 40 includes a bore 40a which extends between the chamber 34 and the hole 36a. A valve seat 40b is threaded into the upper end of the bore 40a. A valve element 40c in the form of a pointed needle is urged by a compression spring 40d upwardly toward sealing engagement with the seat 40b.

The outlet check valve 42 includes a bore 42a which extends between the chamber 34 and the reservoir 22. A valve seat 42b is threaded into the lower end of the bore 42a. A valve element 42c in the form of a pointed needle is urged by a compression spring 42d downwardly toward sealing engagement with the seat 42b.

It should be understood that the invention is not limited to the particular configuration of the check valves 40 and 42, and that the illustrated valves 40 and 42 can be replaced by any other known type of check valve. For example, the valves 40 and 42 may be embodied by the type of valves which are conventionally provided in automobile wheels for tire inflation.

The spring 32 is provided to move the piston 30 to the radially innermost position as illustrated in FIGS. 2 and 3 when the wheel 12 is stationary in which a radially inner end 30c of the piston 30 abuts against a radially inner end 28b of the bore 28. The spring 32 is preferably made as weak as possible while still being able to perform this function.

Generally, the spring 32 must be strong enough to move the piston 30 against its own weight (when the mechanism is inverted from the position of FIG. 3) in addition to the friction between the piston 30 and O-rings 33 and the wall of the bore 28. The forces of the springs 40d and 42d are also small, and will be considered negligible for the purpose of describing the operation of the invention.

As mentioned above, it is possible to mount the pressurizing mechanism at locations other than as illustrated, for example on the rim 14 of the wheel 12 inside the inflation space of the tire 16. In this case, the spring forces and other variables will be adjusted to accommodate additional factors such as the tire pressure acting on the elements of the mechanism.

As the vehicle on which the system 10 is mounted decelerates to a stop, the centrifugal force acting on the piston 30 decreases to zero, and the piston 30 is moved by the spring 32 in combination with the pressure in the chamber 34 toward the position of FIG. 3. The pressure in the chamber 34 drops below the pressure in the reservoir 22, and the outlet check valve 42 closes to disconnect the chamber 34 from the reservoir 22.

The pressure in the chamber 34 decreases as the volume of the chamber 34 increases. As the piston 30 approaches the position of FIG. 3, the pressure in the chamber 34 drops below atmospheric, and the inlet check valve 40 opens to allow communication of the chamber 34 with the atmosphere. This action causes the chamber 34 to be filled with a fresh volume of atmospheric air though the passageway 36 and valve 40.

As the vehicle accelerates from a stop, centrifugal force acting on the piston 30 causes it to move upwardly (as viewed in FIGS. 3 and 4) against the force of the spring 32 from the radially innermost position of FIG. 3 toward a radially outermost position as illustrated in FIG. 4. As the piston 30 moves radially outward, the volume of the chamber 34 decreases and the pressure in the chamber 34 increases. This causes the inlet check valve 40 to close and disconnect the chamber 34 from the atmosphere.

As the pressure in the chamber 34 rises above the pressure in the reservoir 22, the outlet check valve 42 opens to allow communication of the chamber 34 with the reservoir 22. This causes the air which is being compressed in the chamber 34 to flow into the reservoir 22 to increase the pressure therein and replenish air which was used to maintain full inflation of the tire 16.

As the vehicle decelerates toward a stop, the operation described above with reference to FIG. 3 is repeated. In this manner, a compressed volume of air is pumped into the reservoir 22 each time the vehicle accelerates from a stop to a speed which is sufficient for the pressure in the chamber 34 to rise above the pressure in the reservoir 22. The amount of air which is supplied into the reservoir 22 during each of these operations increases with the displacement of the piston 30. If one or two mechanisms 26 are insufficient to maintain the reservoir 22 at the required pressure, more mechanisms 26 can be added to increase the replenishment capacity.

Figure 5:
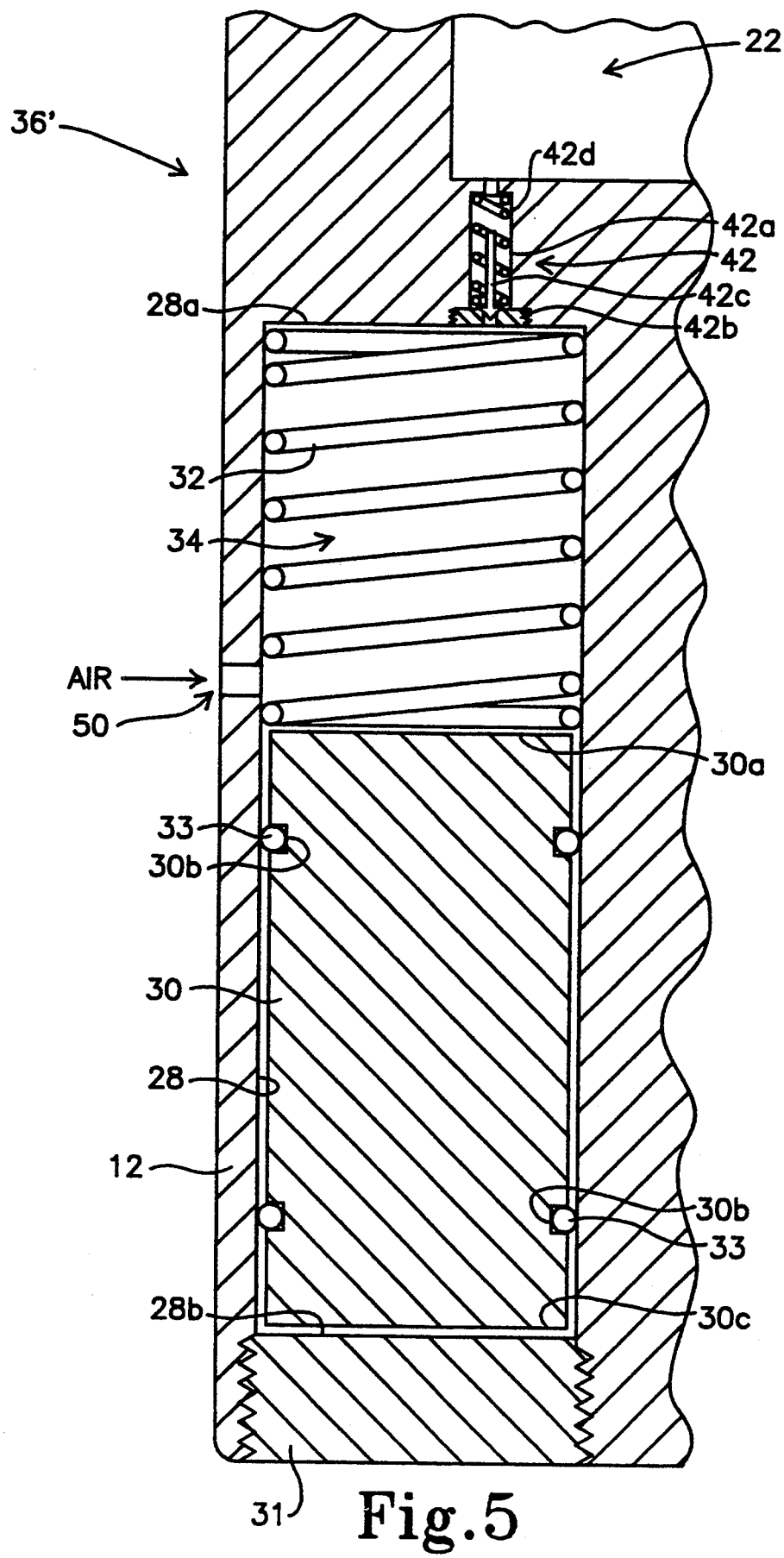
FIG. 5 is an enlarged sectional view illustrating a modified pressurizing mechanism with the wheel stationary.

FIG. 5 illustrates a modified pressurizing mechanism 26' embodying the present invention in which the inlet check valve 40 is replaced by an axial passageway or hole 50 formed through the wheel 12 which communicates with the atmosphere and opens into the bore 28 at a position which is radially outward of the end 30a of the piston 30 when the piston 30 is in the radially innermost position of FIG. 5.

In FIG. 5, the chamber 34 communicates with the atmosphere through the hole 50 and is filled with a fresh volume of atmospheric air. As the piston 30 is moved radially outward by a predetermined distance toward the position of FIG. 4, the piston 30 covers the hole 50 and disconnects the chamber 34 from the atmosphere to perform a function equivalent to that of the inlet check valve 40.

Figure 6:
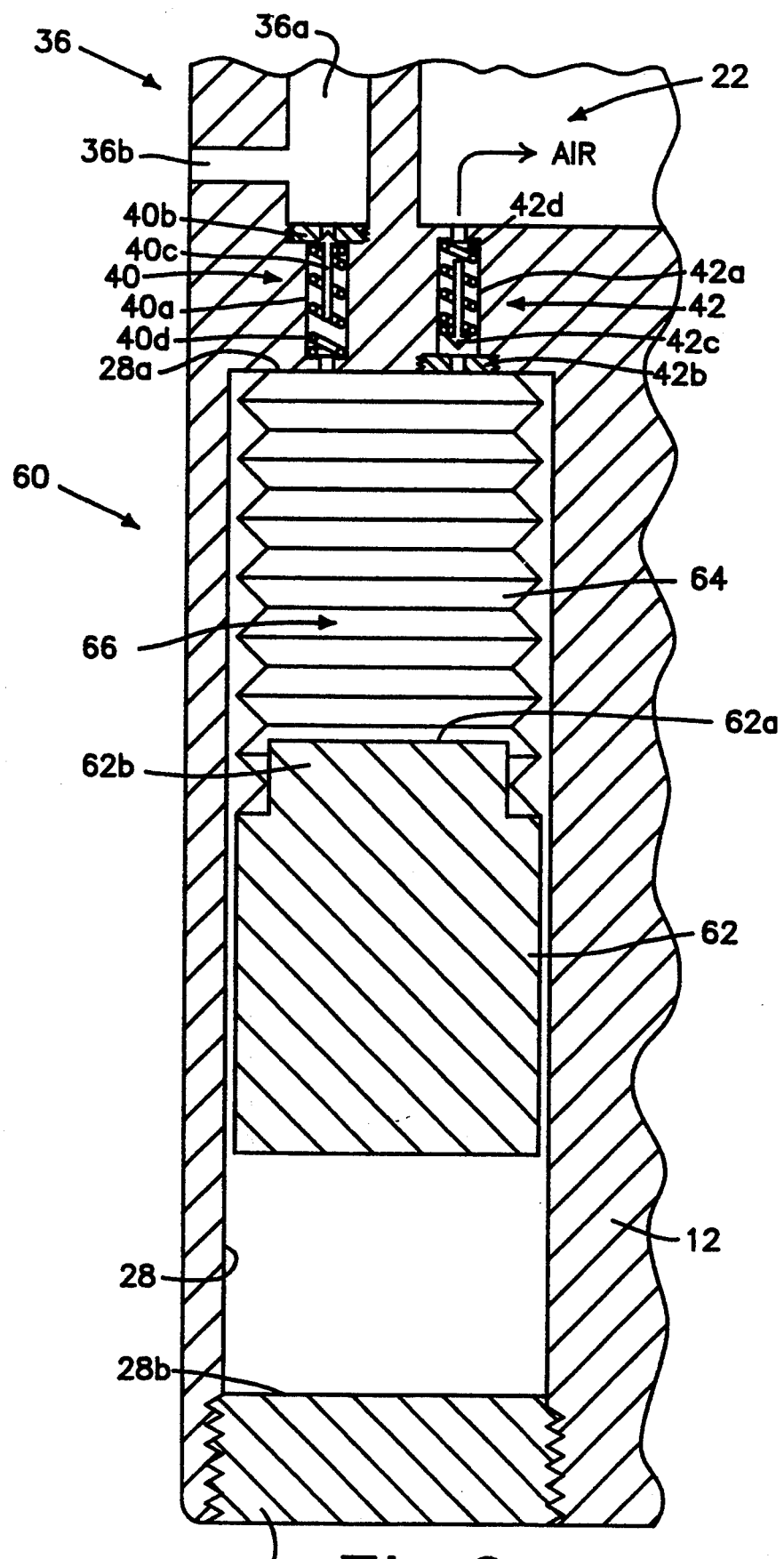
FIG. 6 is an enlarged sectional view illustrating another modified pressurizing mechanism in an intermediate position.

FIG. 6 illustrates another mechanism 60 embodying the present invention in which the piston 30 is replaced by a piston 60 which does not have to sealingly engage with the wall of the bore 28. This enables the piston 60 to move in the bore 28 with very low friction. The spring 32 is replaced by a bellows 64 which is sealingly connected at its ends to the outer end 28a of the bore 28 and an outer end portion of the piston 62 respectively. A compression chamber 66 is defined inside the bellows 64 between the end 28a of the bore 28 and an outer face 62a of the piston 62.

The piston 62 and bellows 64 are illustrated in an intermediate position in FIG. 6. The bellows 64 exerts a radially inward force on the piston 62 which moves it to a radially innermost position when the vehicle is at rest. In the innermost position, the volume of the bellows 64 and thereby the compression chamber 66 is maximum, and the compression chamber 66 fills with a fresh charge of air. As the piston 62 is moved outwardly by centrifugal force in response to movement of the vehicle, the volume of the bellows 64 and thereby the compression chamber 66 decrease, and the air is forced from the compression chamber 66 into the reservoir 22.

In order to maximize the compression ratio of the mechanism 60, the outer end of the piston 62 which terminates in the face 62a is formed with a reduced diameter step portion 62b having an outer diameter which is equal to the inner diameter of the bellows 64. The height of the step portion 62b is equal to the height of the bellows 64 in its most compressed state, which occurs when the piston 62 is in its outermost position.

Substantially the entire volume of the bellows 64 is filled by the step portion 62b in this state, and the volume of the compression chamber 66 is close to zero. This minimizes dead space in the compression chamber 66 in the minimum volume state, and thereby maximizes the compression ratio of the mechanism 60.

It will be understood that the invention is not limited to the specific piston and biasing means shown. Other configurations, for example including a piston and a rolling diaphragm (not shown), are within the scope of the invention.

The vehicle speed which is required to achieve replenishment of air in the reservoir 22 by the mechanism 26, the maximum reservoir pressure attainable and the volume of replenished air per acceleration/deceleration cycle are functions of the dimensions of the bore 28 and piston 30 and the mass of the piston 30. A preferred example of the performance attainable with the present invention will now be presented.

EXAMPLE

An exemplary automotive wheel has a diameter D of 2 ft (60.9 cm), and the mechanism 26 can be located at a radius r of ½ ft (15.24 cm) from the center of the wheel 12. A practical weight W of the piston 30 for a wheel 12 of these dimensions is on the order of ⅜ lb (170.1 g), corresponding to a mass of $11.65 \times 10^{-3}$ slugs.

A practical diameter $d_p$ for the piston 30 is ½ in (1.27 cm), such that the radius $r_p$ of the piston 30 is ¼ in (0.635 cm). The stroke s of the piston 30, or the distance between the positions of FIGS. 3 and 4, is selected to be 1 in (2.54 cm).

Assuming a maximum legal vehicle speed V of 60 mph or 88 ft/sec ($2.682 \times 10^3$ cm/sec), the number of revolutions per second (rps) f of the wheel 12 is $f = V/\pi D = 14$ rps. The tangential velocity v of the piston 30 is $v = 2\pi rf = 44$ ft/sec ($1.34 \times 10^3$ cm/sec), and the centripetal acceleration a of the piston 30 is $a = v^2/r = 3,872$ ft/sec$^2$ ($1.18 \times 10^5$ cm/sec$^2$). The centripetal force F (and equivalently the centrifugal force) acting on the piston 30 is $F = ma = 45$ lb ($2.0 \times 10^7$ dynes).

Due to its high density $d=0.383$ lb/in$^3$ ($1.38 \times 10^{-2}$ g/cm$^3$), the preferred material for the piston 30 is lead. The height H of the piston 30 is $H=W/(\pi dr_p^2)=4.99$ in (12.7 cm). The cross-sectional area A of the piston 30 is $A=\pi r_p^2=0.196$ in$^2$ (1.26 cm$^2$). The volumetric displacement Dp of the piston 30 is $Dp=As=0.196$ in$^3$ (3.21 cm$^3$).

The pressure P on the radially outer end 30a of the piston 30 which corresponds to the centrifugal force F is $P=F/A=230$ psig ($1.59 \times 10^7$ dynes/cm$^2$), which is far in excess of the design reservoir pressure of 50 psig ($3.45 \times 10^6$ dynes/cm$^2$). Since 0 psig=15 psia, 50 psig=65 psia, and the compression ratio R of the piston 30 is $R=15$ psia/65 psia=0.231.

Thus, the volume V1 of air in excess of 50 psig ($3.45 \times 10^6$ dynes/cm$^2$) which can be supplied by one mechanism 26 into the reservoir 22 at the maximum legal speed of 60 mph ($2.682 \times 10^3$ cm/sec) is $V1=Dp \times R=0.045$ in$^3$ (0.74 cm$^3$). With two mechanisms 26 provided in the wheel 12 as illustrated in FIG. 1, the volume V2 of air supplied into the reservoir 22 per acceleration/deceleration cycle is $V2=2 \times V1=0.09$ in$^3$ (1.48 cm$^3$).

A typical tire 16 contains 1,500 in$^3$ ($2.46 \times 10^4$ cm$^3$) of air, and loses 25% per year, or 375 in$^3$ ($6.15 \times 10^3$ cm$^3$) due to its inherent permeability. At the desired tire pressure of 35 psig ($2.41 \times 10^6$ dynes/cm$^2$), the number $N_d$ of acceleration/deceleration cycles per day required to maintain the tire 16 fully inflated is therefore $N_d=375/[(50/35)(365 \times V2)]=8.0$.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A pressurizing mechanism for a wheel, comprising:
   a wheel having a substantially radially extending bore formed therein and a high pressure air reservoir for storing air for inflating a tire mounted on the wheel;
   a piston which is movable in the bore in response to centrifugal force resulting from the rotation of the wheel acting thereon;
   a variable volume compression chamber which is sealingly defined in the bore between radially outer ends of the bore and the piston;
   biasing means for urging the piston radially inward;
   outlet valve means for transmitting air from the compression chamber into the reservoir when the piston is moved radially outward against the biasing means by the centrifugal force resulting from the rotation of the wheel; and
   inlet valve means for transmitting air from the atmosphere into the compression chamber to replenish the air in the chamber when the piston is moved radially inward by the biasing means, the inlet valve means having a passageway which communicates with the atmosphere and opens into the chamber radially outward of said outer end of the piston and a valve element which is capable of movement upwardly towards the passageway.

2. A mechanism as in claim 1, in which the biasing means comprises a compression spring disposed between said outer ends of the bore and the piston.

3. A mechanism as in claim 1, in which the biasing means comprises a bellows which is sealingly connected at its ends to said outer ends of the bore and the piston and defines the compression chamber therein.

4. A mechanism as in claim 1, in which the outlet valve means comprises an outlet check valve which opens when the pressure in the chamber is substantially above the pressure in the reservoir and closes when the pressure in the chamber is substantially below the pressure in the reservoir.

5. A mechanism as in claim 1, in which the inlet valve means comprises an inlet check valve which opens when the pressure in the chamber is substantially below atmospheric pressure and closes when the pressure in the chamber is substantially above atmospheric pressure.

6. A mechanism as in claim 1, in which:
   the biasing means moves the piston to a radially innermost position when the wheel is stationary;
   the passageway communicates the chamber with the atmosphere when the piston is in said innermost position; and
   the piston covers said opening and blocks the passageway to disconnect the chamber from the atmosphere when the piston is moved radially outward from said innermost position by a predetermined distance.

7. A wheel for mounting a tire thereon, comprising:
   a high pressure air reservoir for storing air for inflating a tire;
   regulating valve means for communicating the reservoir with the tire when the pressure in the tire drops below a predetermined value;
   a substantially radially extending bore;
   a piston which is movable in the bore;
   a variable volume compression chamber which is sealingly defined in the bore between radially outer ends of the bore and the piston;
   biasing means for urging the piston radially inward;
   outlet valve means for transmitting air from the compression chamber into the reservoir when the piston is moved radially outward against the biasing means by centrifugal force resulting from rotation of the wheel; and
   inlet valve means for transmitting air from the atmosphere into the compression chamber to replenish the air in the chamber when the piston is moved radially inward by the biasing means.

8. A wheel as in claim 7, in which the biasing means comprises a compression spring disposed between said outer ends of the bore and the piston.

9. A wheel as in claim 7, in which the biasing means comprises a bellows which is sealingly connected at its ends to said outer ends of the bore and the piston and defines the compression chamber therein.

10. A wheel as in claim 7, in which the inlet valve means comprises an inlet check valve which opens when the pressure in the chamber is substantially below atmospheric pressure and closes with the pressure in the chamber is substantially above atmospheric pressure.

11. A wheel as in claim 7, in which the outlet valve means comprises an outlet check valve which opens when the pressure in the chamber is substantially above the pressure in the reservoir and closes with the pressure in the chamber is substantially below the pressure in the reservoir.

12. A wheel as in claim 7, in which:
the biasing means moves the piston to a radially innermost position when the wheel is stationary;
the inlet valve means comprises a passageway which communicates with the atmosphere and opens into the chamber radially outward of said outer end of the piston when the piston is in said innermost position;
the passageway communicates the chamber with the atmosphere when the piston is in said innermost position; and
the piston covers said opening and blocks the passageway to disconnect the chamber from the atmosphere with the piston is moved radially outward from said innermost position by a predetermined distance.

* * * * *